Figure 13:
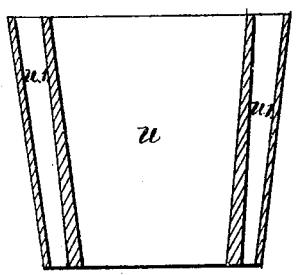

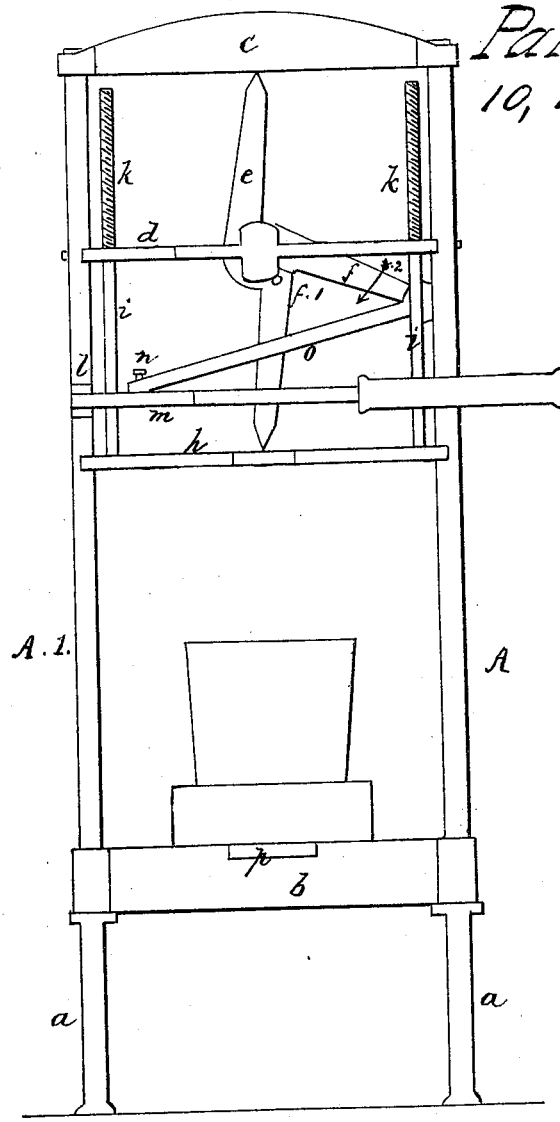
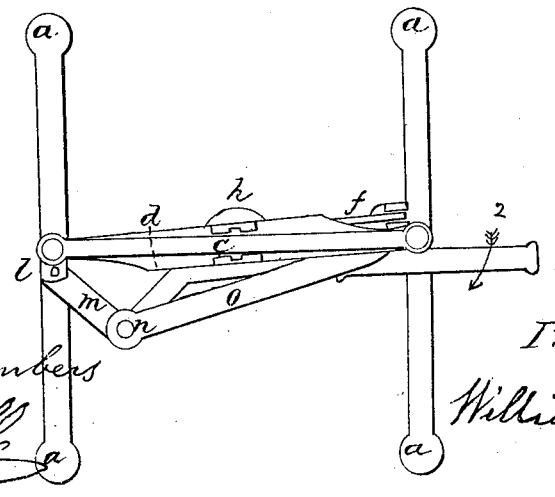

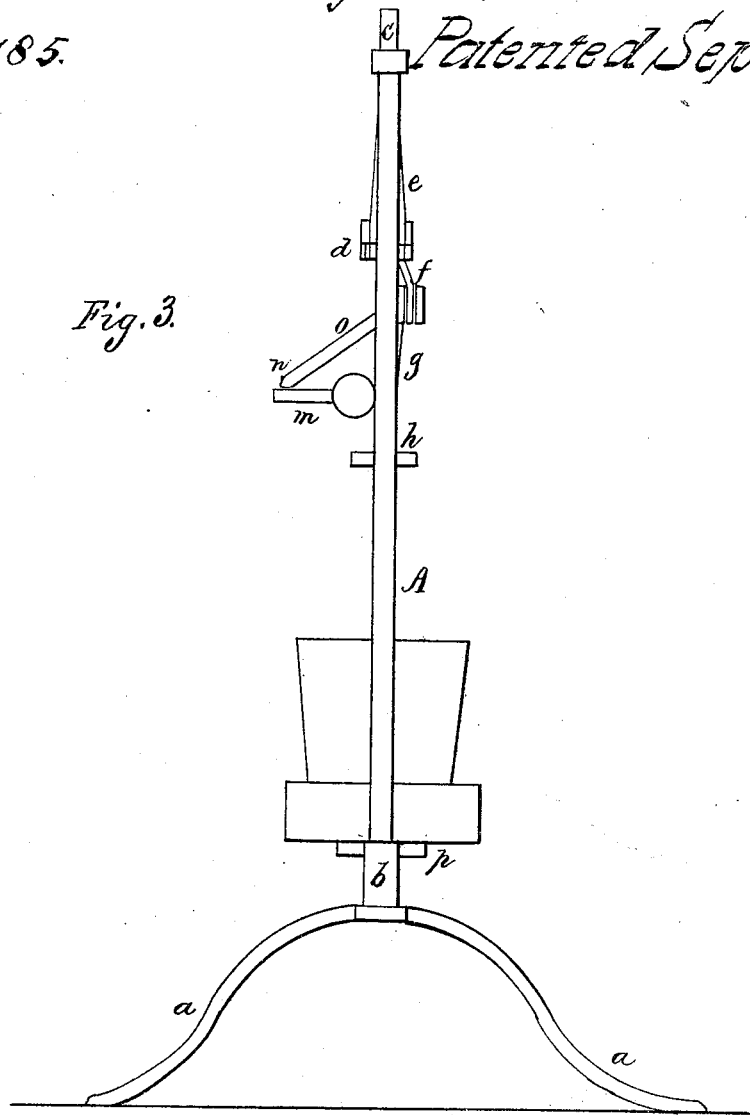

4 Sheets—Sheet 3.
W. Chaplin.
Pressing Hats.
N° 1,785. Patented Sept. 10, 1840.
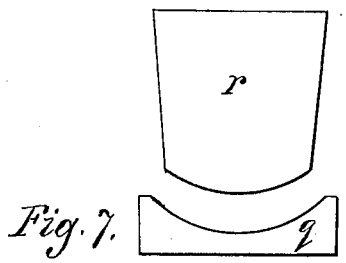
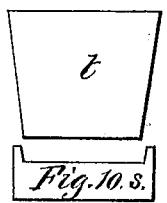
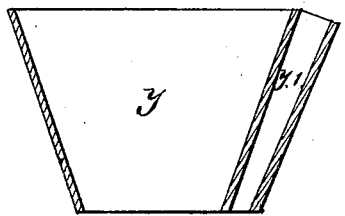
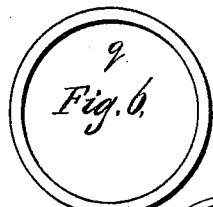
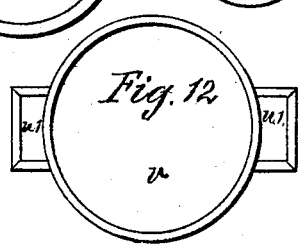
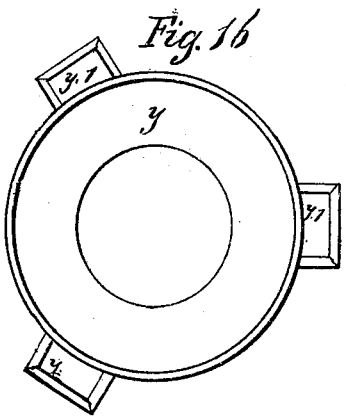
Witnesses.
John W. Chambers
H. R. Serrell
Inventor,
William Chaplin W. Chaplin.
Pressing Hats.
N° 1,785. Patented Sept. 10, 1840.

Witnesses.
John W Chambers
H R Serrell

Inventor:
William Chaplin

UNITED STATES PATENT OFFICE.

WM. CHAPLIN, OF NEW YORK, N. Y.

MANNER OF PRESSING AND FINISHING BONNETS AND HATS AND OTHER MANUFACTURES OF STRAW.

Specification of Letters Patent No. 1,785, dated September 10, 1840.

*To all whom it may concern:*

Be it known that I, WILLIAM CHAPLIN, of the city, county, and State of New York, a native of Great Britain, having resided more than one year next preceding the date hereof in the United States and having duly declared and made oath of my intention to become a citizen thereof, have invented and made and applied to use certain new and useful improvements in the means of pressing and finishing ladies' bonnets and hats and other manufactures of straw or other similar articles made from any vegetable substances by making and using a combination of well-known mechanical means with new means of my own invention not before used for such purposes, by which such pressing and finishing are effected better and with less labor and cost than by the means heretofore practised, and that the said improvements and the means of constructing and using the same are fully and substantially set forth and shown in the following description and in the drawings attached to and making a part of this specification, wherein—

Figure 1, is a plan; Fig. 2, a front elevation; and Fig. 3 is a side elevation of the machine by which the pressure is given, which machine is very similar to a common hand printing press but has not before been used for such purposes as these. The other figures represent the parts which are of my own invention and are referred to hereinafter in describing the uses for which they are severally designed.

A, $A^1$, are a pair of vertical iron standards supported each on a pair of legs $a$ $a$.

$b$ is the lower tie piece with a press bed, $p$.

$c$, is the lintel tie piece, serving also as the upper press piece.

$d$ is a tie, with a diagonal mortise in it, as shown in plan, in the detached Fig. 4 to guide a portion of the working parts.

$e$ is the upper arm of a three part joint. The top end is formed as a pivot to work in a cup in the under side of the lintel tie $c$. The lower end slides in the mortise in the tie $d$ and is jointed at $e^1$, to the lever arm $f$. At $f^1$ the lever $f$ is jointed to the third or lower arm $g$. The lower end of this is a pivot working in a cup on the upper side of the follower $h$. The form of jointing these parts is shown in the detached Fig. 5. The follower $h$ slides between the standards A, $A^1$, and has two carrier bars $i$ $i$ sliding through the tie $d$. On each of these is either an expansive spiral spring $k$, above the tie $d$, as shown in the drawing; or contractile springs may be attached at their upper ends to the tie $d$ and the lower ends be secured to the carrier bars $i$, $i$. In either mode they will keep the follower $h$ to the lower end of the arm $g$.

Figure 20:
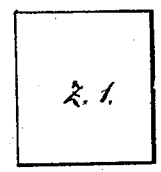

On the standard $A^1$, at $l$ is a knuckle joint carrying the working lever $m$, which has an elbow at $n$ where a pin connects the lever $m$, to a joint bar $o$. The other end of this is jointed to the outer end of the lever $f$ and the machine thus made is to be used as follows: When bonnets are to be pressed the articles are first to be prepared with the usual dressing for stiffening them and the operator is to commence by placing the separate crown pieces singly on the round ended wood die block $r$, Fig. 8, or the square ended die block $t$, Fig. 11, or a die block of any form required by the fashion of the day, previously moistening the die block by a wet sponge. The corresponding cast iron countersunk matrix $q$ or $s$ shown in plan and section in the detached Figs. 6, 7, 9, and 10 is to be previously turned and formed in a lathe smooth and bright, then to be heated for use to about the same degree as a common sad iron for clothes. This is then to be placed on the platform $p$ and the die block and bonnet crown are to be placed into the matrix beneath the follower $h$ and any interval between filled by a wood chock $z^1$, shown in the detached Fig. 20. The operator now draws the lever $m$ in the direction of the arrow 1. This draws the lever $f$ in the direction of the crooked arrow 2 and forces down the follower $h$ and the die block and bonnet crown into close contact with the polished and heated surface of the matrix $q$ or $s$ and almost instantly gives a polished and smooth surface to that part of the bonnet crown. When pressed smooth the workman removes each crown from the die block and places another in to go through the same operation.

Figure 19:
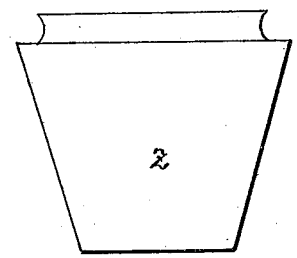
Figure 14:
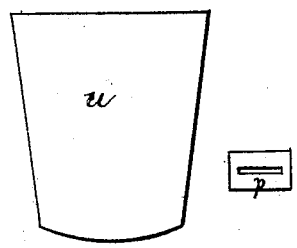
Figure 18:
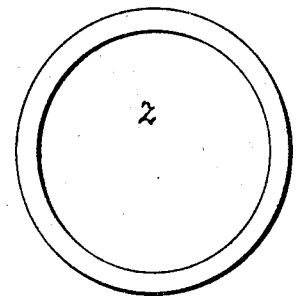
Figure 15:

The time of remaining in contact must be regulated by the judgment of the workman according to the heat retained by the matrix as this will be competent to press a very considerable number of crown tops in succession with much better and more equal effects and far more rapidly than the same work can be done by any other mode now in use in the trade. When the workman has finished the tops he is to remove the countersunk matrix used for this purpose and proceed to press the sides of the crowns by placing each in succession on the die block $w$ Fig. 14, previously moistening the surface of the die block as before described, then pressing the sides of each crown in succession in the conical matrix $v$ shown in plan and section in Figs. 12 and 13 in precisely the same manner as is previously described for pressing the tops, but in this part of the work the heaters $x$, Fig. 15, are to be heated and placed in the heater boxes $w'$, Figs. 12 and 13. These as they cool are to be taken out and replaced by others freshly heated. When the crowns are thus completed the workman is to remove the crown matrix and put the matrix $y$, shown in plan and section in Figs. 16 and 17, into place and put the heaters into the heater boxes $y^1$, then wrap the brims or fronts around the die block $z$ shown in plan and section in Figs. 18 and 19 and subject them to the pressure and contact with the heated metal of the matrix $y$ in the same manner as the crowns, except as follows: In pressing the fronts or brims of bonnets or hats where the mode of making them includes more than one thickness of material, the thinner spaces on them are to be covered with pasteboard to lie flush with the extra thicknesses and give the thinner or single parts a proper pressure without crushing the thicker parts and a covering of pasteboard over a surrounding woolen or linen padding will be needed on the die blocks used for his purpose and must be put on at the discretion of the workman according to the quality and thicknesses of the material he has to operate on and in some cases an extra thickness of pasteboard or a thin wooden wedge inserted between the die block and matrix will be found useful to give the die block a cant and throw the pressure on the opposite side of the block and matrix. Should the dressing in the material cause the crowns or brims to stick on the heated inner surfaces of the cones a blow on the outside of the cone or lower end of the die block with a wooden mallet will disengage it directly. The back pieces belonging to fronts or brims may be pressed by using either of the heated cones and die blocks according to the shape of the piece at the discretion of the workman.

When bonnet or hat fronts can be pressed flat I intend to effect the same by placing them between boards and heated metal plates in several layers or thicknesses and then press them in a common four standard screw press with the needful precautions of placing pasteboard in the thinner spaces and linen or woolen padding between the boards and brims at the discretion of the workman. The same means substantially are equally applicable to pressing any other description of manufacturers of a similar nature and of any vegetable material or substance and I do not intend to confine myself to any specific form of press in effecting such objects although I prefer the one described.

I do not claim to have invented the press herein described or any of the parts thereof, nor do I claim to have invented the wooden die blocks herein described, but I do claim as new and of my own invention, as follows:

1. The application of countersunk heated metal disks for pressing and finishing the crown tops of hats and bonnets in combination with the die block substantially as the same are herein described.

2. The mode of forming the conical matrices and heater boxes with heaters and the combination of the same with the conical die block when such combination is applied to pressing and finishing the sides of bonnet or hat crowns substantially as herein described.

3. The employment of the conical die block for pressing the brims or fronts, and also the employment of paste board to give equal pressure substantially as the same is herein described.

4. The mode of forming the conical matrices and heater boxes with heaters, for pressing bonnet, or hat fronts or brims and the combination thereof with the covered conical die block when such combination is employed for the purpose of pressing bonnet or hat fronts or brims or articles of a similar nature made of vegetable substances substantially as the same are herein described.

In witness whereof I have hereunto set my hand in the city of New York this twenty-seventh day of July one thousand eight hundred and forty in presence of the witnesses signing hereunto.

WILLIAM CHAPLIN. [L. S.]

Witnesses:
 JOHN W. CHAMBERS,
 H. R. SEWELL.